US00RE46876E

(19) United States
(12) Reissued Patent
Garceau

(10) Patent Number: US RE46,876 E
(45) Date of Reissued Patent: May 29, 2018

(54) TIRE CHOCK

(71) Applicant: Norco Industries, Inc., Compton, CA (US)

(72) Inventor: Bernard F. Garceau, Vandalia, MI (US)

(73) Assignee: Norco Industries, Inc., Compton, CA (US)

(21) Appl. No.: 14/613,875

(22) Filed: Feb. 4, 2015

Related U.S. Patent Documents

Reissue of:
(64) Patent No.: 8,365,875
Issued: Feb. 5, 2013
Appl. No.: 12/328,810
Filed: Dec. 5, 2008

(51) Int. Cl.

| | |
|---|---|
| ***B60T 3/00*** | (2006.01) |
| ***B60P 3/077*** | (2006.01) |
| *B60T 1/04* | (2006.01) |
| *B65G 69/00* | (2006.01) |
| *B62B 5/04* | (2006.01) |

(52) U.S. Cl.
CPC ..... *B60P 3/077* (2013.01); *B60T 3/00* (2013.01); *B60T 1/04* (2013.01); *B62B 5/0485* (2013.01); *B65G 69/005* (2013.01)

(58) Field of Classification Search
USPC ..... 188/32, 36, 32.36
See application file for complete search history.

(56) References Cited

U.S. PATENT DOCUMENTS 433,413 A * 7/1890 Lawrence ..... 188/54
4,694,936 A * 9/1987 Jackson ..... 188/2 R
4,715,480 A * 12/1987 Anderson ..... 188/74
4,828,076 A 5/1989 Fox
(Continued)

FOREIGN PATENT DOCUMENTS

| | | | |
|---|---|---|---|
| EP | 0501254 | A2 | 9/1992 |
| JP | H06288497 | A | 10/1994 |
| WO | 2010118768 | A1 | 10/2010 |

OTHER PUBLICATIONS

X-Chock Wheel Stabilizer—Pair—One Handle—28012, http://www.amazon.com/X-Chock-Wheel_Stablizer-Handle-28012/dp/B002HLHUQG as accessed on Oct. 29, 2014, 5 pages.
(Continued)

*Primary Examiner* — Matthew C Graham
(74) *Attorney, Agent, or Firm* — Vorys, Sater, Seymour and Pease, LLP

(57) ABSTRACT

A tire chock having an at least partially threaded rod; a first trunnion having an aperture therethrough that receives the rod; first and second locking members, one locking member being rotatably fixed relative to the rod, the other locking member being rotatably fixed relative to the first trunnion. A tire chock may alternatively have an at least partially threaded rod; an upper trunnion rotatably attached to the rod; a lower trunnion threadedly attached to the rod, the lower trunnion translating axially relative to the rod upon rotation of the rod relative to the lower trunnion; a pair of linkage arms, the pair of linkage arms forming an X-shape, each linkage arm being connected to the lower trunnion by a drive arm and being connected to the upper trunnion by a support arm, wherein, as the rod is rotated relative to the lower trunnion, the linkage arms expand or contract.

22 Claims, 10 Drawing Sheets

(56) References Cited

U.S. PATENT DOCUMENTS

| | | | | | |
|---|---|---|---|---|---|
| 4,934,489 | A | * | 6/1990 | Jackson | 188/2 R |
| 5,158,158 | A | * | 10/1992 | Balogh et al. | 188/2 R |
| D347,821 | S | * | 6/1994 | Few | D12/217 |
| 5,322,143 | A | | 6/1994 | Curran | |
| 5,392,880 | A | * | 2/1995 | Christian | 188/32 |
| 5,547,045 | A | * | 8/1996 | Stutzman | 188/2 R |
| 5,769,186 | A | | 6/1998 | Roberts | |
| 5,971,378 | A | | 10/1999 | Sweeney | |
| 6,425,465 | B1 | | 7/2002 | Tallman et al. | |
| 6,607,181 | B2 | | 8/2003 | Garceau | |
| D535,176 | S | * | 1/2007 | Joiner et al. | D8/330 |
| 7,188,842 | B2 | | 3/2007 | Thorpe | |
| 7,815,178 | B1 | | 10/2010 | Troutman | |
| 8,499,899 | B2 | | 8/2013 | Scott | |
| 8,714,524 | B2 | | 5/2014 | Bacon | |
| 8,733,508 | B2 | | 5/2014 | Bacon | |
| 2004/0108172 | A1 | | 6/2004 | Fox | |

OTHER PUBLICATIONS

"Deluxe Tire Locking Chock", MotorHome Product Review, http://www.themotorhomeguide.com/review_tire_locking_chock.html as accessed on Oct. 29, 2014, 2 pages.

"Kendon Stand Up Bike Lift Assembly and Operations Manual", Kendon Industries, Inc., Rev. Jan. 8, 2007, as obtained from http://www.bikeline.se/dokument/bibliotek/File/datablad/90-392.pdf, 15 pages.

Machine translation of EP 501254 A2 obtained from espacenet.com.*

* cited by examiner

TIRE CHOCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates generally to wheel or tire chocks for recreational vehicles and trailers. More specifically, the present application relates to wheel or tire chocks that are lockable in an engaged position to prevent theft, and chocks that have an improved linkage and engagement position.

BACKGROUND OF THE INVENTION

Tire chocks are used to prevent a vehicle or trailer at rest from inadvertently rolling or moving. Tire chocks function by retarding the movement of the wheel, such that the wheel is effectively locked in place. One of the problems with current tire chocks is that they are susceptible to being stolen, as the tire chock can be removed by any person possessing an appropriately-sized wrench. Another problem with existing tire chocks is that the linkage assembly in the components is complicated and expensive to manufacture.

As such, there is a need for an improved tire chock that addresses one or more problems of the prior art. Accordingly, embodiments of the present invention are hereby submitted.

BRIEF SUMMARY

In one embodiment, a tire chock may comprise an at least partially threaded rod; a first trunnion having an aperture therethrough that receives the rod; first and second locking members, one locking member being rotatably fixed relative to the rod, the other locking member being rotatably fixed relative to the first trunnion.

In a second embodiment, a tire chock may alternatively comprise an at least partially threaded rod; an upper trunnion rotatably attached to the rod; a lower trunnion threadedly attached to the rod, the lower trunnion translating axially relative to the rod upon rotation of the rod relative to the lower trunnion; a pair of linkage arms, the pair of linkage arms forming an X-shape, each linkage arm being connected to the lower trunnion by a drive arm and being connected to the upper trunnion by a support arm, wherein, as the rod is rotated relative to the lower trunnion, the linkage arms expand or contract.

DETAILED DESCRIPTION OF A PREFERRED EMBODIMENT

Figure 1:
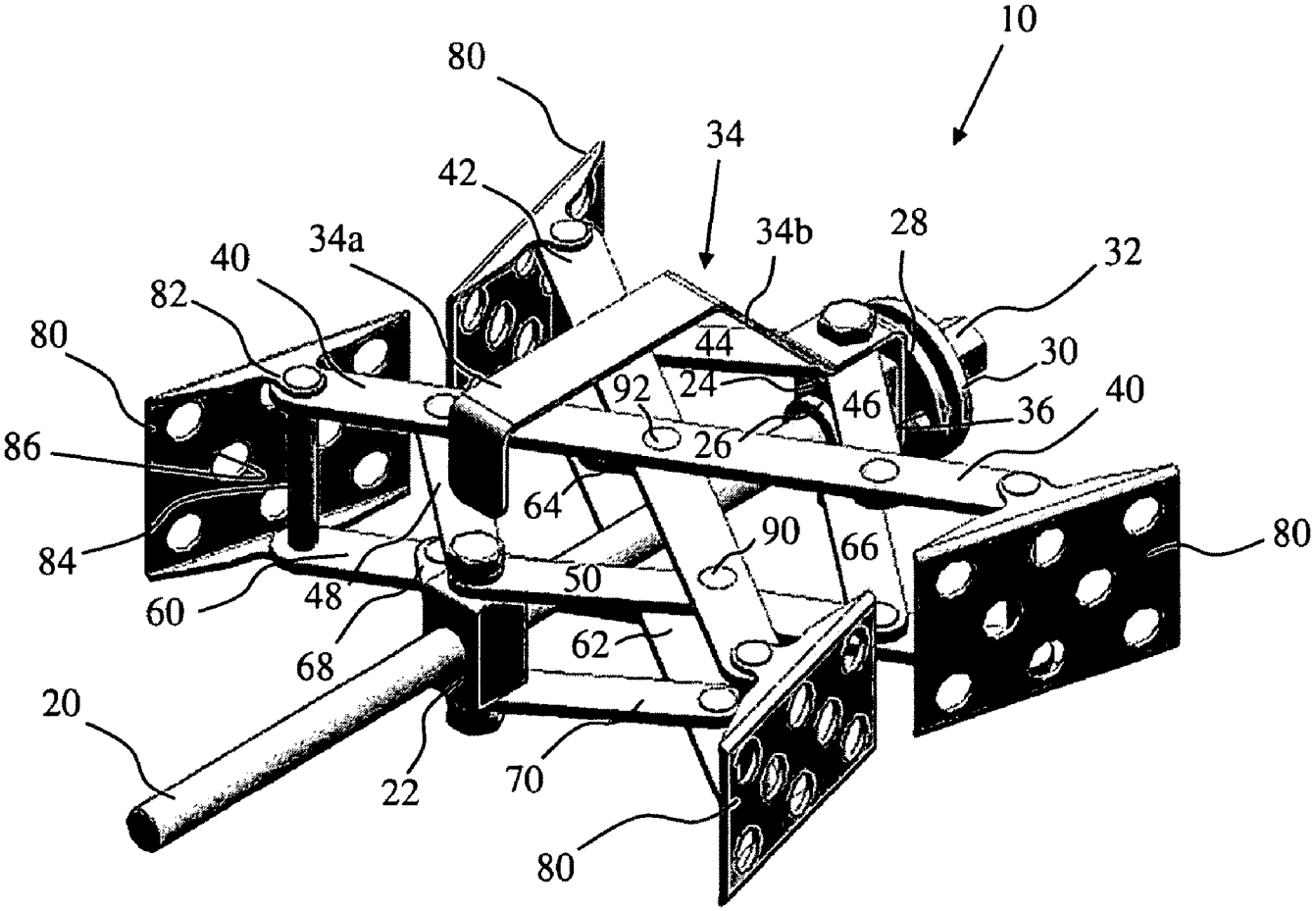
FIG. 1 is a perspective view of an embodiment of a tire chock in an expanded or engaged position.

A preferred embodiment of a tire chock, generally identified by reference numeral 10, is illustrated in FIGS. 1-8. Tire chock 10 may comprise a longitudinally extending threaded bar or rod 20; a lower trunnion 22; an upper trunnion 24; one or more locking members or washers 28, 30; upper nut 32; handle 34; linkage arms 40, 42, 60, 62; a plurality of linkage supports 44, 46, 48, 50, 64, 66, 68, 70; and tire contact pads 80.

As illustrated in FIG. 1, an at least partially threaded rod 20 may extend through tire chock 10. Lower trunnion 22 may be threadedly connected to threaded rod 20 such that as the threaded rod 20 is rotated relative to lower trunnion 22, the trunnion 22 translates axially relative to the threaded rod 20. Tire chock 10 may additionally comprise upper trunnion 24 that is rotatably connected to the threaded bar 20. Upper trunnion 24 may overlie a non-threaded portion of the threaded bar 20 or may not comprise threads, such that as the threaded rod 20 rotates relative to upper trunnion 24, the upper trunnion 24 does not translate relative to the threaded rod 20. Upper trunnion 24 may be associated with washer 26 to provide spacing between threaded portion of threaded bar 20 and non-threaded portion of threaded bar 20. As illustrated in FIG. 1, handle 34 may be attached to upper trunnion 24. Handle 34 may have portion 34d that includes an aperture therethrough, such that threaded bar 20 extends through handle portion 34d. As illustrated in FIG. 1, handle portion 34d may be located adjacent to an upper surface of trunnion 24 on one side, and locking member 28 on the other side.

Tire chock 10 may further comprise at least two locking members, such as washers or disks 28, 30. Washers 28, 30 may have apertures therethrough that receive threaded rod 20. In one embodiment, lower washer 28 may be fixed relative to upper trunnion 24 and handle portion 34d. Any manner known in the art for fixing washer 28 relative to trunnion 24 and handle 34 may be used. For example, washer 28 may be glued or welded to handle 34 or trunnion 24, or may be formed monolithically with handle 34 or trunnion 24.

One or more spacer washers 29 may also be located between lower washer 28 and upper washer 30. Upper washer 30 may be fixed relative to threaded rod 20 and upper nut 32. Similarly to washer 28, any manner known in the art for fixing washer 30 relative to nut 32 or threaded rod 20 may be used. For example, washer 30 may be glued or welded to nut 32 or threaded rod 20, or may be formed monolithically with nut 32 or threaded rod 20. In such a configuration, nut 32, upper washer 30, and threaded rod 20 are all in a fixed relationship relative to each other, such that as a user rotates nut 32, upper washer 30 and threaded rod 20 also rotate. Washer 28 would not rotate relative to nut 32, upper washer 30, and threaded rod 20.

Figure 2:
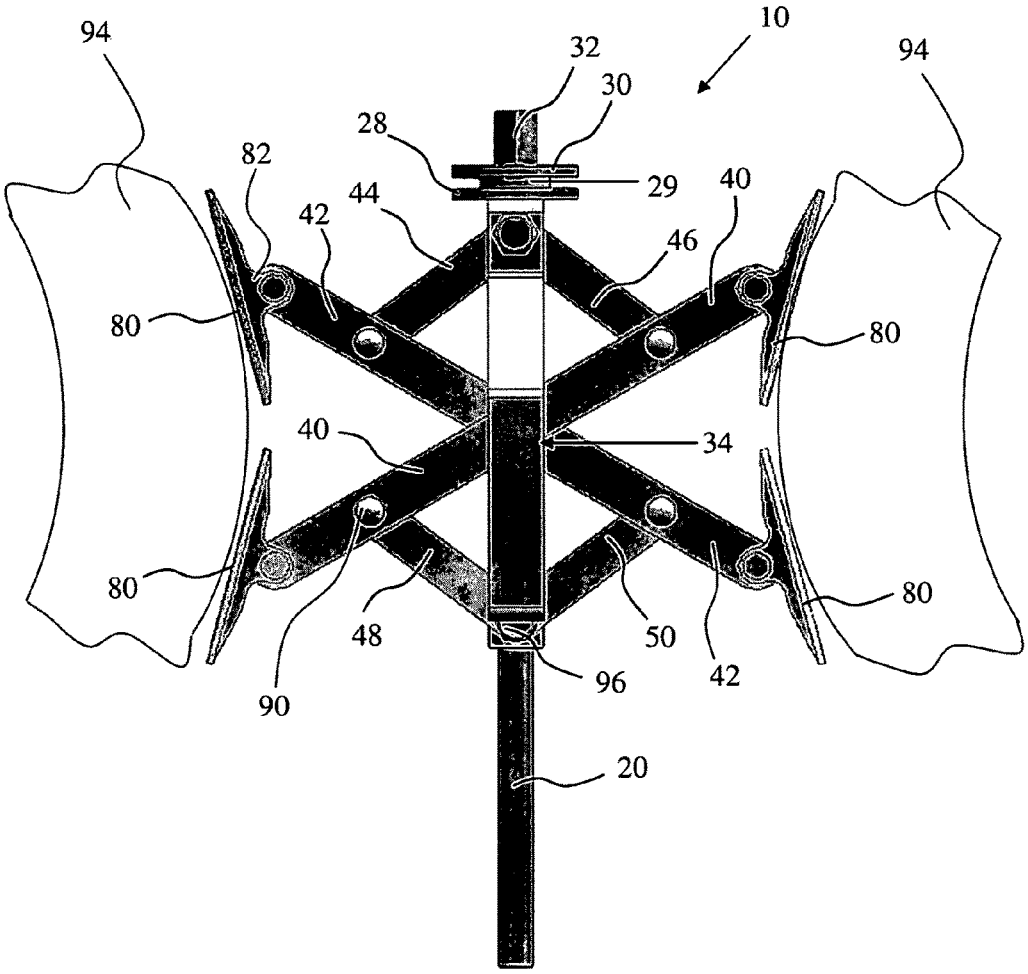
FIG. 2 is a side view of the tire chock of FIG. 1 in an expanded position.
Figure 3:
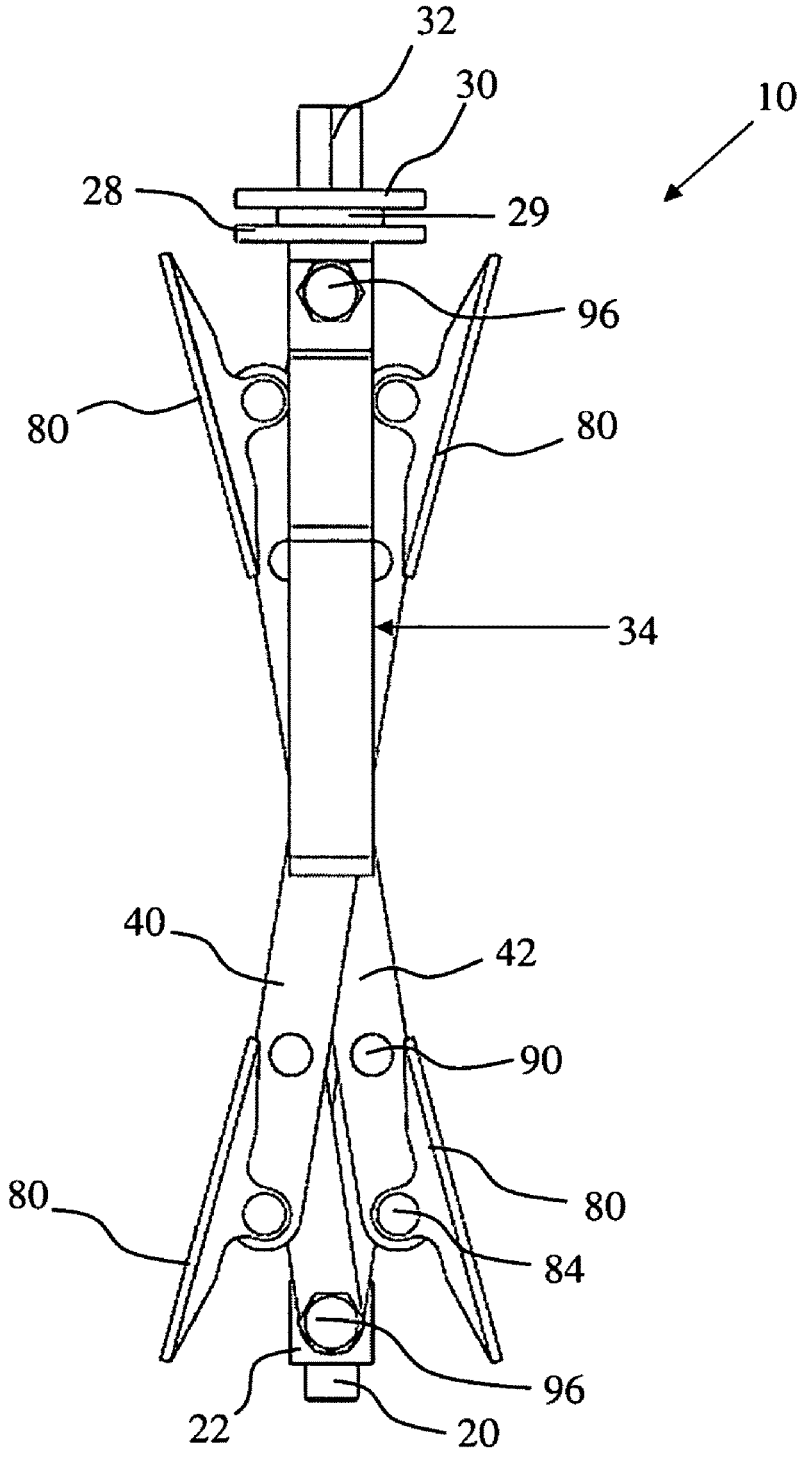
FIG. 3 is a side view of the tire chock of FIG. 1 in a collapsed position.
Figure 4:
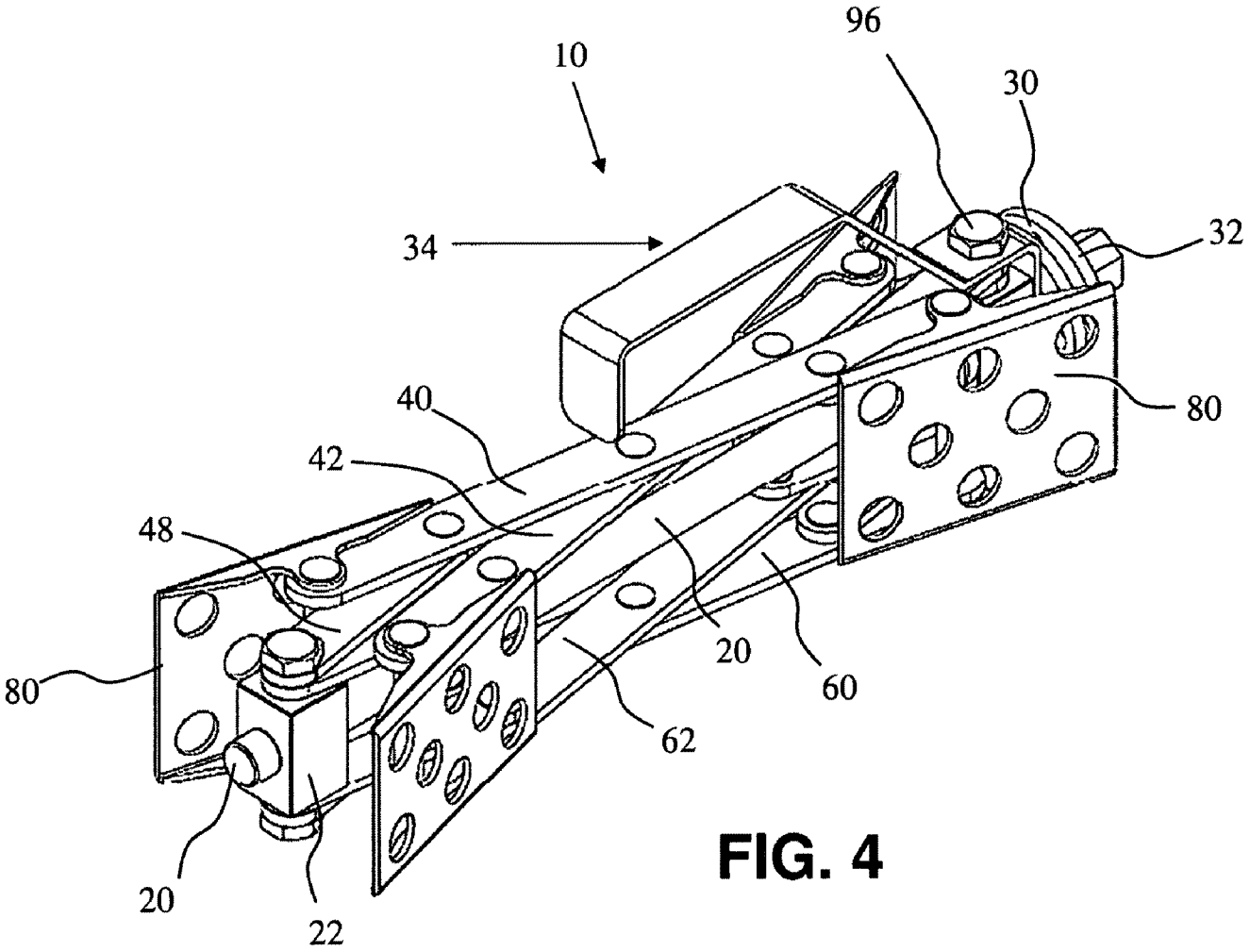
FIG. 4 is a perspective view of the tire chock of FIG. 1 in a collapsed position.
Figure 5:
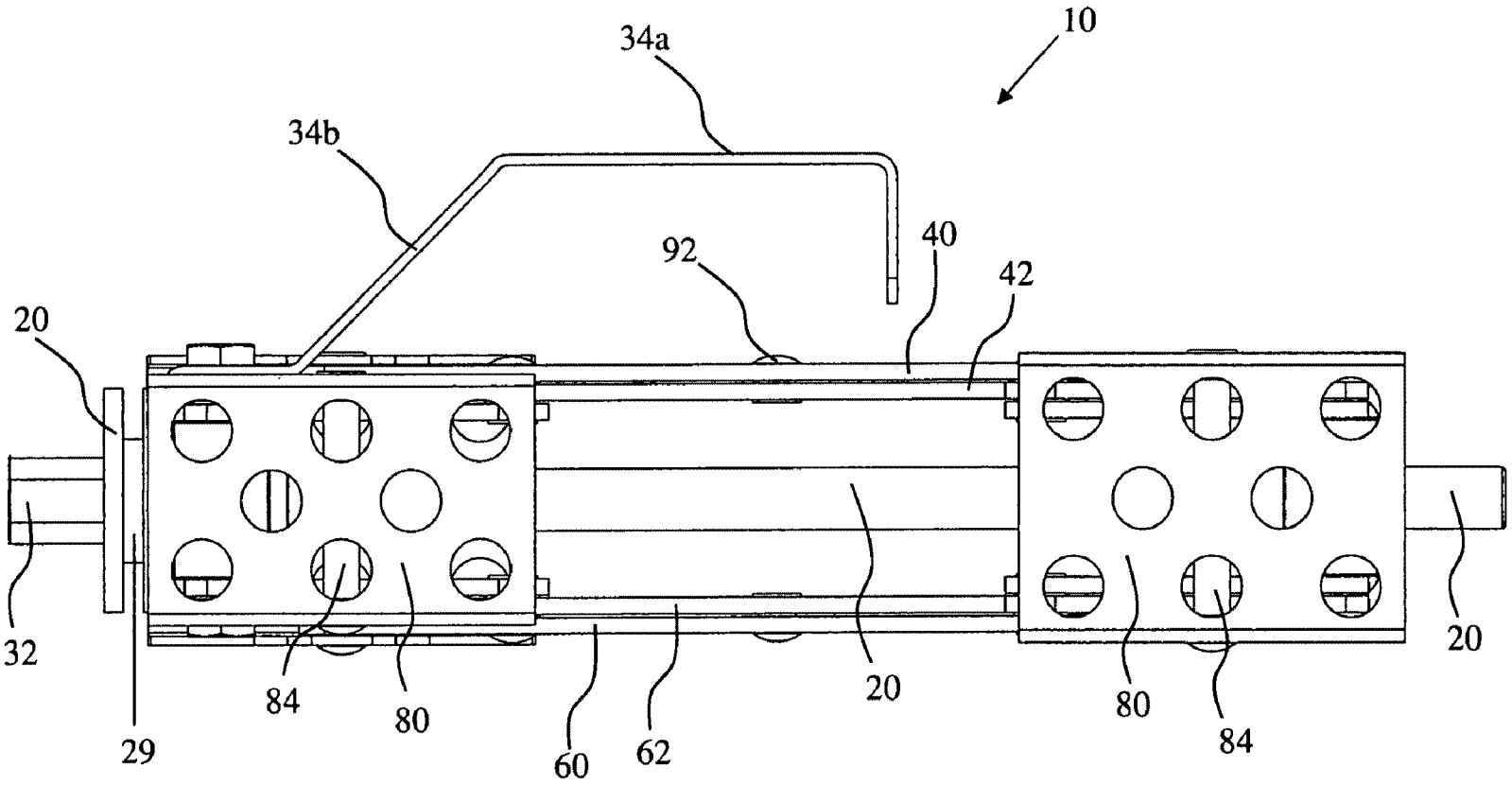
FIG. 5 is a side elevational view of the tire chock of FIG. 1.
Figure 6:
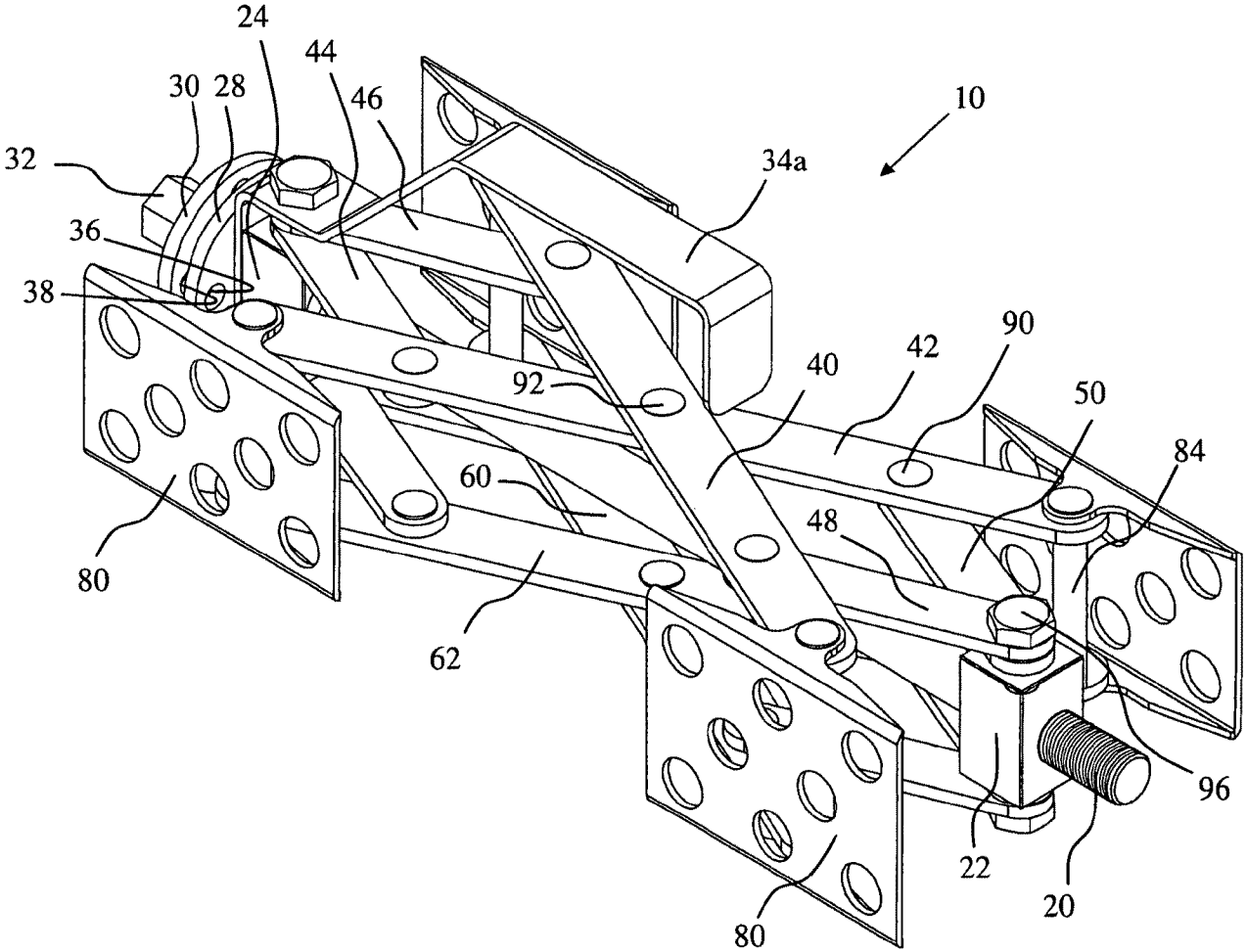
FIG. 6 is a second perspective view of the tire chock of FIG. 1.
Figure 7:
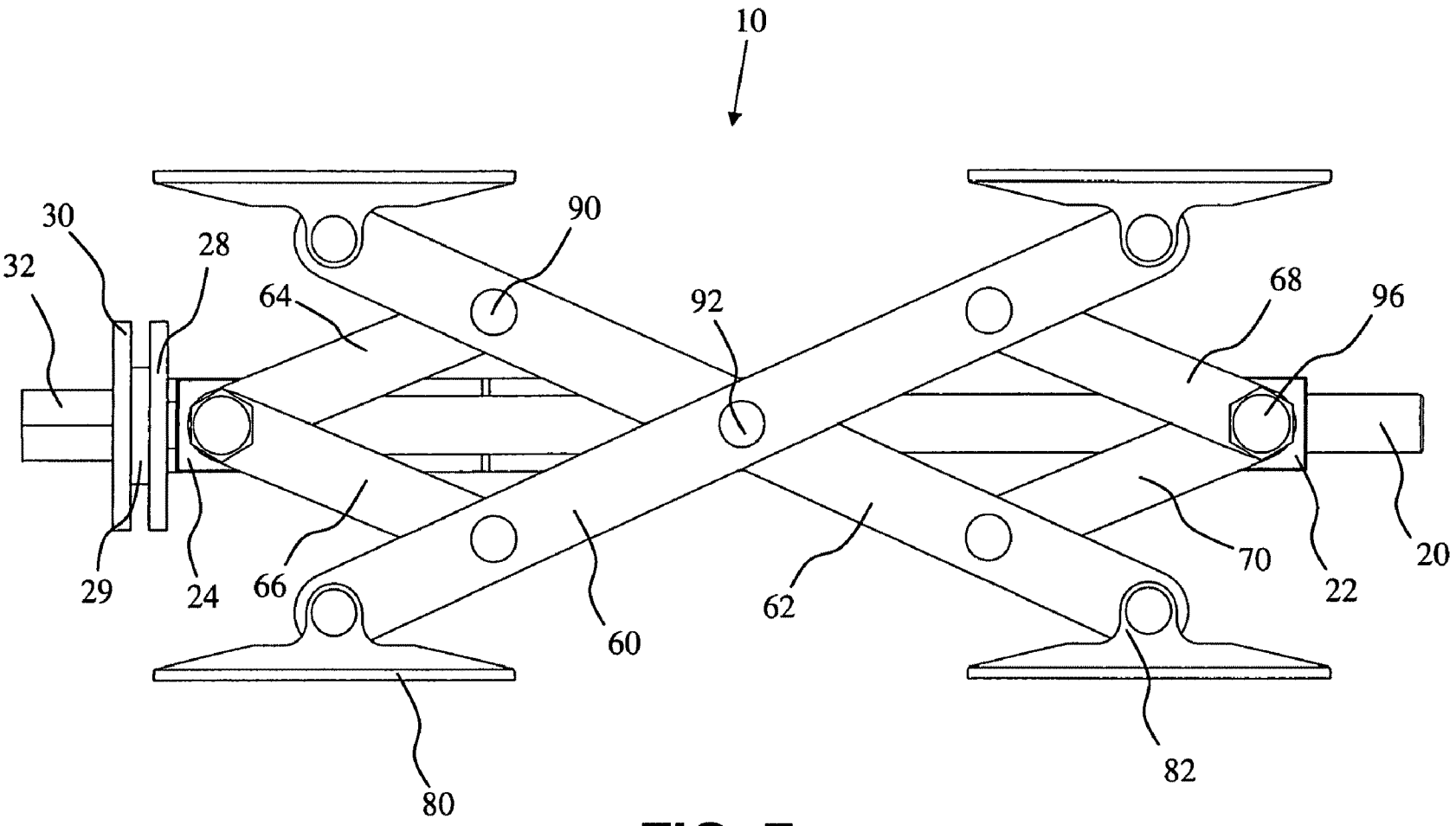
FIG. 7 is bottom view of the tire chock of FIG. 1.
Figure 8:
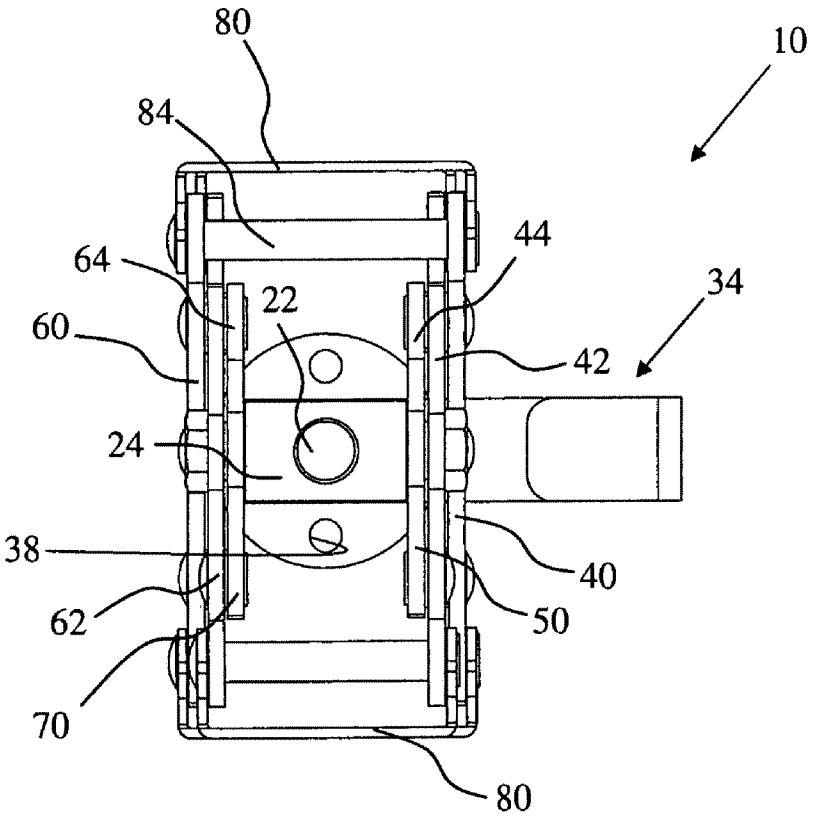
FIG. 8 is an end view of the tire chock of FIG. 1.

As illustrated in FIGS. 1 and 8, lower washer 28 and upper washer 30 may comprise a plurality of apertures 36, 38 therethrough. Since lower washer 28 may be fixed relative to upper trunnion 24 and handle 34; and upper washer 30 may be fixed relative to threaded rod 20 and nut 32, tire chock 10 is able to be locked in any position by aligning aperture 36 in lower washer 28 with aperture 38 in upper washer 30 and inserting a lock or pin through both apertures 36, 38. After the shaft of a lock or the like is inserted through apertures 36, 38, the threaded rod 20 is unable to be rotated relative to lower washer 28, handle 34, and thus upper trunnion 24. In use, a user may position the chock 10 between two tires 94, expand chock 10 by actuation/rotation of nut 32 by wrench or similar tool into a desired position, as illustrated in FIG. 2. The user may then align apertures 36, 38 and insert a lock therethrough. As the chock 10 may be frictionally secured between the respective tires 94, and the nut 32 is unable to be rotated to collapse the chock 10, the chock 10 may be locked in place until the lock is removed.

Figure 9:
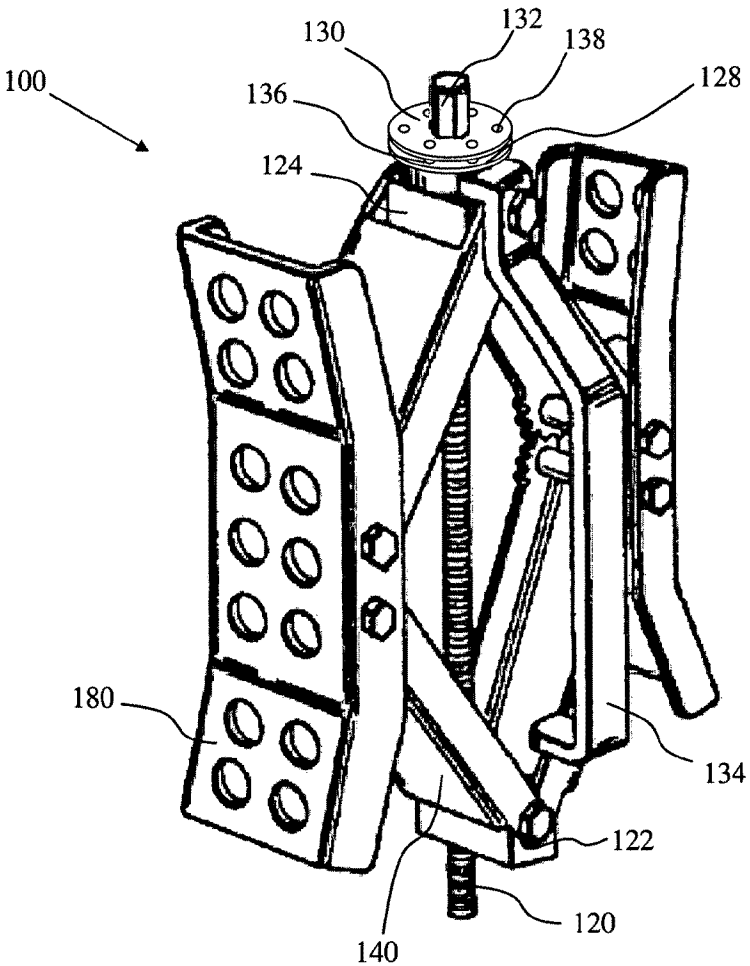
FIG. 9 is a perspective view of a second embodiment of a tire chock.
Figure 10:
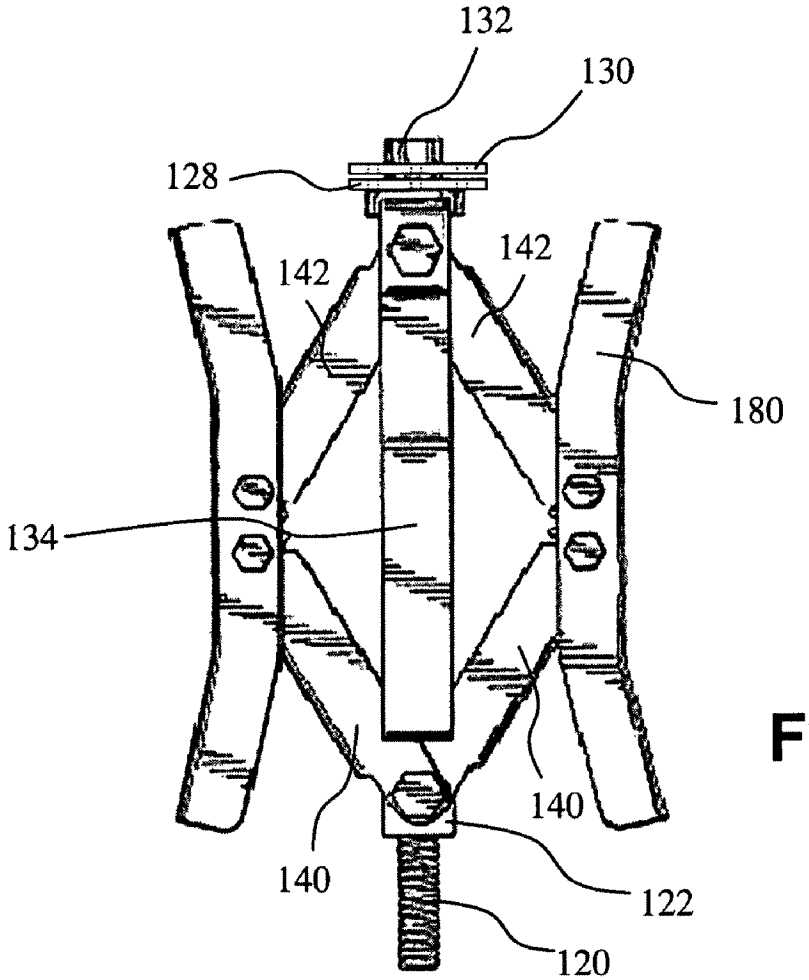
FIG. 10 is a top plan view of the tire chock of FIG. 9.

A second embodiment of chock 110 having a locking mechanism is illustrated in FIGS. 9-10. Chock 110 may comprise threaded rod 120; lower translating trunnion 122; upper trunnion 124; lower locking member 128; upper locking member 130; nut 132; handle 134; a pair of lower driver arms 140 rotatably connected on one end to trunnion 122 and rotatably connected on the other end to tire contact pads 180; and upper support arms 142 rotatably connected on one end to upper trunnion 124 and rotatably connected on the other end to tire contact pads 180. Lower trunnion 122 may be threadedly connected to threaded rod 120 such that trunnion 122 translates axially relative to the rod 120 when the rod 120 is rotated relative to trunnion 122. The axial translation of trunnion 122 causes the chock 110 to expand or contract.

As illustrated in FIGS. 9-10, lower locking member 128 and upper locking member 130 may comprise a plurality of apertures 136, 138 therethrough. Since lower locking member 128 may be fixed relative to upper trunnion 124 and handle 134; and upper washer 130 may be fixed relative to threaded rod 120 and nut 132, tire chock 110 is able to be locked in any position by aligning aperture 136 in lower locking member 128 with aperture 138 in upper locking member 130 and inserting a lock or pin through both apertures 136, 138. After the shaft of a lock or the like is inserted through apertures 136, 138, the threaded rod 120 is unable to be rotated relative to lower locking member 128, handle 134, and thus upper trunnion 124. In use, a user may position the chock 110 between two tires 94, and expand chock 110 by actuation/rotation of nut 132 by wrench or similar tool into a desired position. The user may then align apertures 136, 138 and insert a lock therethrough. As the chock 110 may be frictionally secured between the respective tires, and the nut 132 is unable to be rotated to collapse the chock 110, the chock 110 may be locked in place until the lock is removed.

In another aspect of an improved tire chock, as illustrated in FIGS. 1-8, a tire chock may comprise threaded rod 20; lower trunnion 22 that threadedly receives threaded rod 20 and which translates relative to thread rod 20 upon rotation of threaded rod 20 relative to trunnion 22; and upper trunnion 24 that is rotatable relative to threaded rod 20 but does not translate when threaded rod 20 is rotated relative to upper trunnion 24. Chock 10 may further comprise linkage arms 40, 42, 60, 62. Each linkage arm end may be attached at an end thereof to a tire engaging pad 80.

As illustrated in the Figures, linkage arms 40 and 42 may be located on one side of the threaded rod 20, and linkage arms 60 and 62 may similarly configured as linkage arms 40 and 42 yet located on a side opposite from linkage arms 40 and 42. Linkage arms 40 and 42 may be rotatably connected at a center point by a rivet 92. Linkage arm 40 may also be connected on one end to a left lower tire contact pad 80 and connected on the opposite end to a right upper contact pad 80. Linkage arm 42 may be similarly connected on one end to left upper tire contact pad 80 and connected on the opposite end to right lower tire contact pad 80. In such a formation, linkage arms 40 and 42 form an "X" shape.

As illustrated in FIGS. 1 and 2, linkage arm 40 may be rotatably connected on its lower portion to mobile trunnion 22 via a drive arm 48 extending from a bolt or other connector 96 associated with mobile trunnion 22 to a rivet 90 located between center point rivet 92 and tire pad connecting bolt 84. Similarly, linkage arm 42 may be connected on its lower portion to mobile trunnion 22 via drive arm 50 extending from a bolt or other connector 96 associated with mobile trunnion 22 to a rivet 90 located between center point rivet 92 and tire pad connecting bolt 84. The drive arm connections to both the mobile trunnion 22 and to the linkage arms 40, 42 may be rotatable.

To aid in stabilizing linkage arms 40 and 42, each arm 40, 42 may also be connected on its upper portion to upper stationary trunnion 24. As illustrated, linkage arm 40 may be connected to upper trunnion 24 via support arm 46 extending from a bolt or other connector 96 associated with upper trunnion 24 to a rivet 90 located between center point rivet 92 and tire pad connecting bolt 84. Similarly, linkage arm 42 may be connected to upper trunnion 24 via support arm 44 extending from a bolt or other connector 96 associated with upper trunnion 24 to a rivet 90 located between center point rivet 92 and tire pad connecting bolt 84.

Linkage arms 60 and 62, drive arms 68, 70, and support arms 64, 66 may be attached in a similar manner on the opposite side of threaded bar 20 and trunnions 22, 24, forming a mirror image of linkage arms 40, 42, drive arms 48, 50, and support arms 44, 46, as described below.

Linkage arms 60 and 62 may be rotatably connected at a center point by a rivet 92. Linkage arm 60 may also be connected on one end to a left lower tire contact pad 80 and connected on the opposite end to a right upper contact pad 80. Linkage arm 62 may be similarly connected on one end to left upper tire contact pad 80 and connected on the opposite end to right lower tire contact pad 80. In such a formation, linkage arms 40 and 42 form an "X" shape.

As illustrated in FIGS. 1 and 2, linkage arm 60 may be rotatably connected on its lower portion to mobile trunnion 22 via a drive arm 68 extending from a bolt or other connector 96 associated with mobile trunnion 22 to a rivet 90 located between center point rivet 92 and tire pad connecting bolt 84. Similarly, linkage arm 62 may be connected on its lower portion to mobile trunnion 22 via drive arm 70 extending from a bolt or other connector 96 associated with mobile trunnion 22 to a rivet 90 located between center point rivet 92 and tire pad connecting bolt 84. The drive arm connections to both the mobile trunnion 22 and to the linkage arms 60, 62 may be rotatable.

To aid in stabilizing linkage arms 60 and 62, each arm 60, 62 may also be connected on its upper portion to upper stationary trunnion 24. As illustrated, linkage arm 60 may be connected to upper trunnion 24 via support arm 66 extending from a bolt or other connector 96 associated with upper trunnion 24 to a rivet 90 located between center point rivet 92 and tire pad connecting bolt 84. Similarly, linkage arm 62 may be connected to upper trunnion 24 via support arm 64 extending from a bolt or other connector 96 associated with upper trunnion 24 to a rivet 90 located between center point rivet 92 and tire pad connecting bolt 84.

As illustrated in FIGS. 1-8, the ends of linkage arms 40, 42, 60, 62 may be connected to tire contact pads 80. In the embodiment illustrated in FIGS. 1-8, linkage arms 40 and 60 may be connected to the left lower contact pad 80 and the right upper contact pad 80. Similarly, linkage arms 42 and 62 may be connected to the right lower contact pad 80 and left upper contact pad 80.

Tire contact pads 80 may each include two mounting flanges 82 that include an aperture (not numbered) that receive bolts or other fasteners 84. To connect the respective tire contact pad 80 to chock 10, the apertures in mounting flanges 82 are aligned with corresponding apertures in the respective linkage arms 40, 60 or 42, 62 and the bolt or fastener 84 is inserted through each aperture. A nut or other fastener may be used to secure the bolt 84 in place. When attached to chock 10, the tire contact pads may be rotatable relative to the associated linkage arms 40, 60 or 42, 62.

It is contemplated that the chock 10 as illustrated in FIGS. 1-8 may 1⅜ inches wide when the chock is in its contracted position. As the chock 10 expands, linkage arms 40, 42, 60, 62 rotate about their center points 92, such that the lower portions of the linkage arms 40, 42, 60, 62 rotate outward and upward, and the upper portions of the linkage arms 40, 42, 60, 62 rotate outward and downward. In other words, the "X" shapes formed by the linkage arms 40, 42, and 60, 62 goes from taller and narrower to shorter and wider. As tire contact pads 80 may be rotatably connected to the linkage arms 40, 42, 60, 62, the tire pads 80 rotate to the ideal tire contact position and may accommodate different sizes of tires 94.

The foregoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

[1. A tire chock, comprising:

an at least partially threaded rod;

a first trunnion having an aperture therethrough that receives the rod;

a first support member, having two opposite ends, rotatably connected to the first trunnion and supporting a first contact pad and a second contact pad at respective opposite ends;

a second support member, having two opposite ends, rotatably connected to the first trunnion and supporting a first contact pad and a second contact pad at respective opposite ends;

wherein the first support member and the second support member are both rotatably connected to the first trunnion about a common center point;

a first locking member rotatably fixed relative to the rod; and a second locking member rotatably fixed relative to the first trunnion.]

[2. The tire chock of claim 1, wherein both the first and second locking members each have at least one aperture therethrough, the apertures being adapted to receive a lock.]

[3. The tire chock of claim 1, further comprising a second trunnion threadedly attached to the threaded rod.]

[4. A tire chock, comprising:

an at least partially threaded rod;

an upper trunnion rotatably attached to the rod;

a lower trunnion threadedly attached to the rod, the lower trunnion translating axially relative to the rod upon rotation of the rod relative to the lower trunnion;

a first locking member rotatably fixed relative to the rod;

a second locking member rotatably fixed relative to the upper trunnion; and a pair of linkage arms, each having two opposite ends, each linkage arm supporting at least one contact pad at each end of each linkage arm, the pair of linkage arms forming an X-shape, each linkage arm being connected to the lower trunnion by a respective drive arm rotatably connected to the lower trunnion and being connected to the upper trunnion by a respective support arm rotatably connected to the upper trunnion, the pair of linkage arms both rotatably connected about a common center point, wherein, as the rod is rotated relative to the lower trunnion, the linkage assembly formed by the linkage arms expand or contract.]

*5. A tire chock comprising*

*an at least partially threaded rod;*

*a first trunnion having an aperture therethrough that receives the rod;*

*a first support member, having two opposite ends and a center point therebetween, the first support member supporting a first contact pad and a second contact pad at respective opposite ends;*

*a second support member, having two opposite ends and a center point therebetween, the second support member supporting a third contact pad and a fourth contact pad at respective opposite ends;*

*wherein the first support member center point and the second support member center point are rotatably connected to each other and both the first support member and second support member are each rotatably interconnected to the first trunnion about a common center point on the first trunnion;*

*a first locking member rotatably fixed relative to a rotation of the rod; and*

*a second locking member rotatably fixed relative to the first trunnion.*

*6. The tire chock of claim 5, wherein both the first and second locking members each have at least one aperture therethrough, the apertures being adapted to receive a lock.*

*7. The tire chock of claim 5, further comprising a second trunnion that is threadedly attached to the threaded rod.*

*8. The tire chock of claim 5, wherein the first support member and the second support member are rotatably interconnected to the first trunnion about the first trunnion common center point by way of a first upper linkage arm that rotatably interconnects an upper midpoint of the first support member to the first trunnion common center point and by way of a second upper linkage arm that rotatably interconnects an upper midpoint of the second support member to the first trunnion common center point.*

*9. The tire chock of claim 8, wherein axial movement of the first trunnion along the at least partially threaded rod drives the first upper linkage arm and second upper linkage arm, so as to expand or collapse the first support member's first and second contact pads and to expand or collapse the second support member's third and fourth contact pads.*

*10. The tire chock of claim 7, further comprising a first lower linkage arm and a second lower linkage arm, the first lower linkage arm rotatably interconnecting a common center point on the second trunnion to a lower midpoint of the second support member, the second lower linkage arm*

*rotatably interconnecting the second trunnion common center point to a lower midpoint of the first support member.*

*11. The tire chock of claim 10, wherein rotation of the at least partially threaded rod relative to the second trunnion threadedly attached thereto causes the second trunnion to translate axially along the at least partially threaded rod, and wherein translation of the second trunnion drives the first lower linkage arm and second lower linkage arm to expand or collapse the first support member's first and second contact pads and the second support member's third and fourth contact pads, respectively.*

*12. The tire chock of claim 11, wherein the first trunnion does not translate relative to the at least partially threaded rod.*

*13. The tire chock of claim 12, wherein the first support member and the second support members are rotatably connected to the first trunnion common center point by way of a first upper linkage arm that rotatably interconnects an upper midpoint of the first support member to the first trunnion common center point and by way of a second upper linkage arm that rotatably interconnects an upper midpoint of the second support member to the first trunnion common center point.*

*14. The tire chock of claim 8, wherein any of the first support member, the second support member, the first upper linkage arm, and the second upper linkage arm, comprise at least a pair of first support members, second support members, first upper linkage arms, and second upper linkage arms, respectively.*

*15. The tire chock of claim 13, wherein the first support member, the second support member, the first upper linkage arm, the second upper linkage arm, the first lower linkage arm, and the second lower linkage arm are each disposed on a first side of the tire chock;*

*wherein any of the first support member, the second support member, the first upper linkage arm, the second upper linkage arm, the first lower linkage arm, and the second lower linkage arm, comprise at least a second first support member, second support member, first upper linkage arm, second upper linkage arm, first lower linkage arm, and second lower linkage arm, respectively; and*

*wherein any of the respective at least second first support member, second support member, first upper linkage arm, second upper linkage arm, first lower linkage arm, and second lower linkage arm are disposed on a second side of the tire chock opposite the first side.*

*16. The tire chock of claim 8, further comprising a second trunnion that is threadedly attached to the threaded rod.*

*17. The tire chock of claim 16 further comprising a first lower linkage arm and a second lower linkage arm, the first lower linkage arm rotatably interconnecting a common center point on the second trunnion to a lower midpoint of the second support member, the second lower linkage arm rotatably interconnecting the second trunnion common center point to a lower midpoint of the first support member.*

*18. The tire chock of claim 17, wherein rotation of the at least partially threaded rod relative to the second trunnion threadedly attached thereto causes the second trunnion to translate axially along the at least partially threaded rod, and wherein translation of the second trunnion drives the first lower linkage arm and second lower linkage arm to expand or collapse the first support member's first and second contact pads and the second support member's third and fourth contact pads, respectively.*

*19. The tire chock of claim 5 further comprising a handle fixed relative to another portion of the tire chock.*

*20. The tire chock of claim 18 further comprising a handle attached to at least one of the first and second trunnions.*

*21. A tire chock, comprising:*

*an at least partially threaded rod having an upper end and a lower end;*

*an upper trunnion having an aperture therethrough that receives the rod, the upper trunnion disposed about an upper portion of the at least partially threaded rod;*

*a lower trunnion disposed about a lower portion of the at least partially threaded rod;*

*a pair of linkage arms, each having an upper end and a lower end, the upper end and lower end being opposite from each other, wherein*

*the linkage arms are rotatable about a common center point and form an x-shape, and*

*each upper end having an upper contact pad pivotally attached thereto and each lower end having a lower contact pad pivotally attached thereto;*

*a respective lower arm connected to each linkage arm between the common center point and the respective lower end, each lower arm rotatably connected to the lower trunnion;*

*a respective upper arm connected to each linkage arm between the common center point and the respective upper end, each upper arm rotatably connected to the upper trunnion;*

*a first locking member rotatably fixed relative to the threaded rod; and*

*a second locking member rotatably fixed relative to the upper trunnion,*

*wherein as the rod is rotated relative to the lower trunnion and the upper trunnion, at least the lower trunnion translates axially relative to the rod to expand or contract the contact pads relative to the at least partially threaded rod.*

*22. The tire chock of claim 21, wherein each upper contact pad and each lower contact pad includes a fastener that pivotally attaches the contact pad to the linkage arm.*

*23. The tire chock assembly of claim 21, wherein the linkage arms are pivotably attached at the common center point.*

*24. The tire chock of claim 21 further comprising a handle attached to at least one of the upper and lower trunnions.*

*25. The tire chock assembly of claim 21 further comprising*

*a second pair of linkage arms each having an upper end and a lower end, the upper end and lower end being opposite from each other, wherein the linkage arms are rotatable about a common center point and form an x-shape;*

*each upper end pivotally attached to the upper contact pad and each lower end pivotally attached to the lower contact pad; and*

*a second respective lower arm connected to each second linkage arm between the common center point and a respective lower end, each second lower arm ratably connected to the lower trunnion, a respective second upper arm connected to each second linkage arm between the common center point and a respective upper end, each second upper arm rotatably connected to the upper trunnion, wherein the second pair of linkage arms are spaced from the pair of linkage arms by the upper and lower trunnion.*

*26. The tire chock of claim 25, wherein the pair of linkage arms are pivotally attached at the common center point by a fastener and wherein the second pair of linkage arms is attached by a second fastener.*

* * * * *